(12) United States Patent
Wu et al.

(10) Patent No.: US 11,462,048 B2
(45) Date of Patent: Oct. 4, 2022

(54) UNDER-SCREEN FINGERPRINT MODULE, ELECTRONIC DEVICE AND FINGERPRINT IMAGE PROCESSING METHOD

(71) Applicant: GUANGDONG OPPO MOBILE TELECOMMUNICATIONS CORP., LTD., Guangdong (CN)

(72) Inventors: Anping Wu, Guangdong (CN); Le Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/244,647

(22) Filed: Apr. 29, 2021

(65) Prior Publication Data

US 2021/0248346 A1 Aug. 12, 2021

Related U.S. Application Data (63) Continuation of application No. PCT/CN2019/107868, filed on Sep. 25, 2019.

(30) Foreign Application Priority Data

Oct. 30, 2018 (CN) .......................... 201811280517.5
Oct. 30, 2018 (CN) .......................... 201821777831.X (51) Int. Cl.
  *G06V 40/13* (2022.01)
  *G06F 3/041* (2006.01)
(52) U.S. Cl.
  CPC ........ *G06V 40/1324* (2022.01); *G06F 3/0414* (2013.01); *G06V 40/1312* (2022.01)
(58) Field of Classification Search
  None
  See application file for complete search history.

(56) References Cited

U.S. PATENT DOCUMENTS

2017/0147853 A1 5/2017 Sun et al.
2019/0034690 A1* 1/2019 Jung .................... G02B 5/3025
(Continued)

FOREIGN PATENT DOCUMENTS

CN 106845451 A 6/2017
CN 107065274 A 8/2017
(Continued)

OTHER PUBLICATIONS

International Search Report with English Translation for PCT/CN2019/107868 dated Dec. 24, 2019 (12 pages).
(Continued)

*Primary Examiner* — Joseph R Haley
(74) *Attorney, Agent, or Firm* — Young Basile Hanlon & MacFarlane, P.C.

(57) ABSTRACT

An under-screen fingerprint module for an electronic device is provided. The electronic device includes a screen defining a preset area and arranged with a first polarizer to filter first optical noise, and a back cover; the fingerprint module being arranged between the two. At least part of a vertical projection of the preset area on the back cover and that of the fingerprint module are overlapped. The fingerprint module includes a second polarizer to filter the first optical noise as reflected light of first light being part of emitted light of the screen and irradiated along a direction perpendicular to the screen and away from the back cover. A polarization direction of the second polarize and the first polarizer are same. The second polarizer is further configured to filter second optical noise as second light being part of the emitted light and irradiated along a direction towards the back cover.

20 Claims, 5 Drawing Sheets

(56) References Cited

U.S. PATENT DOCUMENTS

2019/0095674 A1* 3/2019 Ko ................... G02B 19/0009
2019/0121420 A1* 4/2019 Kaza .................... G06F 1/3218
2019/0354226 A1* 11/2019 Choi .................. H04L 63/0861

FOREIGN PATENT DOCUMENTS

| CN | 107239737 A | 10/2017 |
| --- | --- | --- |
| CN | 207802009 U | 8/2018 |
| CN | 109284742 A | 1/2019 |
| CN | 208922287 U | 5/2019 |

OTHER PUBLICATIONS

Extended European Search Report for EP Application 19879834.0 dated Dec. 9, 2021. (11 pages).

* cited by examiner

UNDER-SCREEN FINGERPRINT MODULE, ELECTRONIC DEVICE AND FINGERPRINT IMAGE PROCESSING METHOD

CROSS-REFERENCE TO RELATED APPLICATION(S)

The present application is a continuation-application of International (PCT) Patent Application No. PCT/CN2019/107868, filed on Sep. 25, 2019, which claims priority of Chinese Patent Application No. 201811280517.5 filed on Oct. 30, 2018 and Chinese Patent Application No. 201821777831.X filed on Oct. 30, 2018, the entire contents of all of which are hereby incorporated by reference.

TECHNICAL FIELD

The present disclosure relates to the technical field of electronic devices, and in particular to an under-screen fingerprint module, an electronic device and a fingerprint image processing method.

BACKGROUND

With the continuous development of fingerprint collection technology, current electronic devices such as mobile phones can already support the under-screen fingerprint recognition function. After a user activates the mobile phone, the user may trigger the mobile phone to collect fingerprint graphics through the under-screen fingerprint module by pressing a power button and other methods. However, at present, the collected image of the under-screen fingerprint module is affected by optical noise, and the recognition success rate is still difficult to satisfy a same requirement of a traditional fingerprint module of the mobile phone.

SUMMARY

Embodiments of the present disclosure provides an under-screen fingerprint module, an electronic device and a fingerprint image processing method.

In a first aspect, the present disclosure provides an under-screen fingerprint module for an electronic device, the electronic device including a screen and a back cover connected and opposite to the screen; the screen defining a preset area and being arranged with a first polarizer configured to filter a first optical noise; wherein the under-screen fingerprint module is configured to be arranged between the back cover and the screen, and at least part of a vertical projection of the preset area on the back cover and at least part of a vertical projection of the under-screen fingerprint module on the back cover are overlapped; and includes a body and a second polarizer arranged in the body; a polarization direction of the second polarize is configured to be the same as that of the first polarizer; the second polarizer is configured to filter the first optical noise; the first optical noise is reflected light, the reflected light being light generated from first light reflected by the screen, the first light being part of emitted light of the screen and irradiated along a direction perpendicular to a surface of the screen and away from the back cover of the electronic device; the second polarizer is further configured to filter a second optical noise; the second optical noise is direct light, the direct light being second light, which is part of the emitted light of the screen and irradiated along a direction perpendicular to the surface of the screen and towards the back cover of the electronic device.

In a second disclosure, the present disclosure provides an electronic device, including a back cover; a screen, connected and opposite to the back cover, defining a preset area, and arranged with a first polarizer configured to filter a first optical noise; and an under-screen fingerprint module, arranged between the back cover and the screen, and including a body and a second polarizer arranged in the body; a polarization direction of the second polarize is configured to be the same as that of the first polarizer; the second polarizer is configured to filter the first optical noise; the first optical noise is reflected light, the reflected light being light generated from first light reflected by the screen, the first light being part of emitted light of the screen and irradiated along a direction perpendicular to a surface of the screen and away from the back cover of the electronic device; the second polarizer is further configured to filter a second optical noise; the second optical noise is direct light, the direct light being second light, which is part of the emitted light of the screen and irradiated along a direction perpendicular to the surface of the screen and towards the back cover of the electronic device.

In a third aspect, the present disclosure provides a fingerprint image processing method, for an electronic device; the electronic device including a screen defining a preset area and being arranged with a first polarizer; a back cover connected and opposite to the screen; and an under-screen fingerprint module configured to be arranged between the back cover and the screen; wherein at least part of a vertical projection of the preset area on the back cover and at least part of a vertical projection of the under-screen fingerprint module on the back cover are overlapped; the under-screen fingerprint module includes a body and a second polarizer arranged in the body; a polarization direction of the second polarize is configured to be the same as that of the first polarizer; the method includes: in response to detecting a fingerprint collection instruction, lighting the screen and activating the under-screen fingerprint module; wherein a first optical noise corresponding to emitted light of the screen is filtered by the first polarizer and the second polarizer; a second optical noise corresponding to the emitted light of the screen is filtered by the second polarizer; the first optical noise is reflected light, the reflected light is light generated from first light reflected by the screen, the first light is part of the emitted light of the screen and irradiated along a direction perpendicular to a surface of the screen and away from the back cover of the electronic device; the second optical noise is direct light, the direct light being second light, which is part of the emitted light of the screen and irradiated along a direction perpendicular to the surface of the screen and towards the back cover of the electronic device; and collecting light generated from the emitted light reflected by a fingerprint by the under-screen fingerprint module, and obtaining a fingerprint image after processing.

BRIEF DESCRIPTION OF DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

To make any one of skill in the art to understand the technical solutions of the present disclosure, the technical solutions provided by the present disclosure will be described clearly and completely by referring to the drawings and the embodiments. Obviously, the described embodiments are only part of the embodiments of the present disclosure, but not all the embodiments. Based on the embodiments in the present disclosure, all other embodiments obtained by those skilled in the art without creative work fall within the scope of the present disclosure.

The terms of "first" and "second" in the description and claims of the present disclosure and the above drawings are to distinguish different objects, not to describe a specific order. In addition, the terms of "including" and "having" and any variations thereof are intended to cover non-exclusive inclusions. For example, a process, method, system, product, or device that includes a series of steps or units is not limited to the listed steps or units, but optionally includes steps or units that are not listed, or optionally also includes other steps or units inherent to the process, method, product, or device.

Reference herein to "embodiments" means that specific features, structures, or characteristics described in connection with the embodiments may be included in at least one embodiment of the present disclosure. The appearance of the term in various places in the specification does not necessarily refer to a same embodiment, nor is it an independent or alternative embodiment mutually exclusive with other embodiments. Those skilled in the art understand explicitly and implicitly that the embodiments described herein can be combined with other embodiments.

The electronic device involved in the embodiments of the present disclosure may be an electronic device equipped with an optical fingerprint sensor. The electronic device may support wired or wireless charging. For example, the electronic device may be charged in a dedicated charging box and connected to another electronic device such as a mobile phone for supporting functions such as calling and music. The electronic device may include various handheld devices, in-vehicle devices, wearable devices, computing devices with wireless communication functions or other processing apparatus connected to wireless modems, as well as various forms of user equipment (UE), mobile station (MS), terminal device, etc.

Figure 1:
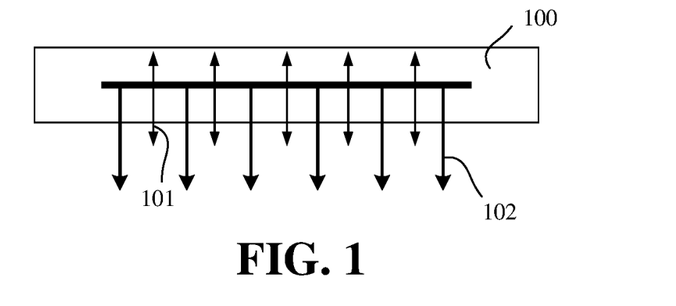
FIG. 1 is a schematic view of fingerprint optical noise according to an embodiment of the present disclosure.

"Under-screen fingerprint" is a technology, in which a recognition module is arranged under a screen panel of a mobile phone. During the recognition, a red-green-blue (RGB) light emitted by the module penetrates the panel to form a fingerprint light film at a fingertip. Then the collected fingerprint information is fed back to the recognition module. By means of a system comparison, a fingerprint authentication may be achieved, and an external capacitive sensor is no longer required. During the fingerprint collection, a built-in light source shines on the finger, and the light is emitted from a bottom side beneath the finger. The angle of the light refracted on the uneven lines of the fingerprint on the surface of the finger will be different. The lightness of the reflected light will be different. After being collected by the optical fingerprint sensor, a multi-gray fingerprint image that can be processed by the fingerprint device algorithm is formed. However, when the built-in light source emits light penetrating the panel to form the fingerprint light film at the fingertips and being reflected back, part of the light forms a noise source for fingerprint recognition. Referring to FIG. 1, FIG. 1 is a schematic view of fingerprint optical noise according to an embodiment of the present disclosure. 100 refers to a screen. 101 refers to reflected light, that is, noise light from screen light (light from the built-in light source) reflected upward by an upper surface of a glass of the screen, which may be called as a first optical noise. The reflected light is incident perpendicular to the upper surface of the glass, that is, the reflected light is perpendicular to the screen direction. 102 refers to direct light, that is, noise light from the screen light downwardly transmitting and directly reaching the fingerprint sensor, which may be called as a second optical noise. The noise light may affect the accuracy of optical fingerprint recognition and reduce the speed of fingerprint recognition.

In view of the above problems, the embodiments of the present disclosure will be described in detail.

The present disclosure provides an under-screen fingerprint module for an electronic device, the electronic device including a screen and a back cover connected and opposite to the screen; the screen defining a preset area and being arranged with a first polarizer configured to filter a first optical noise; wherein the under-screen fingerprint module is configured to be arranged between the back cover and the screen, and at least part of a vertical projection of the preset area on the back cover and at least part of a vertical projection of the under-screen fingerprint module on the back cover are overlapped; and includes a body and a second polarizer arranged in the body; a polarization direction of the second polarize is configured to be the same as that of the first polarizer; the second polarizer is configured to filter the first optical noise; the first optical noise is reflected light, the reflected light being light generated from first light reflected by the screen, the first light being part of emitted light of the screen and irradiated along a direction perpendicular to a surface of the screen and away from the back cover of the electronic device; the second polarizer is further configured to filter a second optical noise; the second optical noise is direct light, the direct light being second light, which is part of the emitted light of the screen and irradiated along a direction perpendicular to the surface of the screen and towards the back cover of the electronic device.

In some embodiments, the body includes a collimating lens, an infrared film, and an optical fingerprint sensor; the second polarizer is arranged between the collimating lens and the infrared film; the infrared film is arranged on a surface of the optical fingerprint sensor.

In some embodiments, the collimating lens and the second polarizer are integrated or stacked.

In some embodiments, the integrated arrangement of the collimating lens and the second polarizer includes the second polarizer being embedded into the collimating lens to form a collimating lens with a polarization function; and the stacked arrangement of the collimating lens and the second polarizer includes the second polarizer being stacked on a side of the collimating lens facing the optical fingerprint sensor.

In some embodiments, the second polarizer and the infrared film are integrated or stacked.

In some embodiments, the integrated arrangement of the second polarizer and the infrared film includes the second polarizer and the infrared film being embedded to form an infrared film with a polarization function or form a polarizer with an infrared film function; the stacked arrangement of the second polarizer and the infrared film includes the second polarizer being stacked on a side of the infrared film facing the collimating lens.

In some embodiments, the body includes a collimating lens, an infrared film, and an optical fingerprint sensor; the second polarizer is arranged between the infrared film and the optical fingerprint sensor; the infrared film is arranged on a surface of the collimating lens.

In some embodiments, the infrared film and the second polarizer are integrated or stacked.

In some embodiments, the second polarizer and the optical fingerprint sensor are integrated or stacked.

The present disclosure provides an electronic device, including: a back cover; a screen, connected and opposite to the back cover, defining a preset area, and arranged with a first polarizer configured to filter a first optical noise; and an under-screen fingerprint module, arranged between the back cover and the screen, and including a body and a second polarizer arranged in the body; a polarization direction of the second polarize is configured to be the same as that of the first polarizer; the second polarizer is configured to filter the first optical noise; the first optical noise is reflected light, the reflected light being light generated from first light reflected by the screen, the first light being part of emitted light of the screen and irradiated along a direction perpendicular to a surface of the screen and away from the back cover of the electronic device; the second polarizer is further configured to filter a second optical noise; the second optical noise is direct light, the direct light being second light, which is part of the emitted light of the screen and irradiated along a direction perpendicular to the surface of the screen and towards the back cover of the electronic device.

In some embodiments, the under-screen fingerprint module is arranged in a space between the preset area of the screen and the back cover, and arranged adjacently to an inner surface of the screen; wherein at least part of a vertical projection of the preset area on the back cover and at least part of a vertical projection of the under-screen fingerprint module on the back cover are overlapped.

In some embodiments, at least one of the first optical noise and the second optical noise are light emitted from the preset area.

In some embodiments, the first optical noise and the second optical noise are both perpendicular to the screen.

The present disclosure provides a fingerprint image processing method, for an electronic device; the electronic device including a screen defining a preset area and being arranged with a first polarizer; a back cover connected and opposite to the screen; and an under-screen fingerprint module configured to be arranged between the back cover and the screen; wherein at least part of a vertical projection of the preset area on the back cover and at least part of a vertical projection of the under-screen fingerprint module on the back cover are overlapped; the under-screen fingerprint module includes a body and a second polarizer arranged in the body; a polarization direction of the second polarize is configured to be the same as that of the first polarizer; the method includes: in response to detecting a fingerprint collection instruction, lighting the screen and activating the under-screen fingerprint module; wherein a first optical noise corresponding to emitted light of the screen is filtered by the first polarizer and the second polarizer; a second optical noise corresponding to the emitted light of the screen is filtered by the second polarizer; the first optical noise is reflected light, the reflected light is light generated from first light reflected by the screen, the first light is part of the emitted light of the screen and irradiated along a direction perpendicular to a surface of the screen and away from the back cover of the electronic device; the second optical noise is direct light, the direct light being second light, which is part of the emitted light of the screen and irradiated along a direction perpendicular to the surface of the screen and towards the back cover of the electronic device; and collecting light generated from the emitted light reflected by a fingerprint by the under-screen fingerprint module, and obtaining a fingerprint image after processing.

In some embodiments, the lighting the screen includes: lighting the preset area of the screen.

In some embodiments, the lighting the preset area of the screen includes: increasing a difference in the brightness between the preset area of the screen and other areas of the screen by increasing a brightness of the preset area of the screen in the condition of the screen being in a bright state; and lighting the preset area of the screen in the condition of the screen being in an off state, and other areas of the screen remain in the off state.

In some embodiments, the lighting the screen includes: lighting the whole screen.

In some embodiments, the lighting the all areas of the screen includes: increasing a brightness of the whole screen in the condition of the screen being in the bright state; and lighting the whole screen in the condition of the screen being in the off state.

In some embodiments, the lighting the screen includes: detecting a system state of the electronic device, and lighting the screen based on the system state; wherein the system state includes at least one of: a screen state and a battery state.

In some embodiments, in a case of the system state including the battery state, the lighting the screen based on the system state includes: lighting the preset area of the screen or lighting all areas of the screen with a minimum brightness required by the optical fingerprint sensor in response to a power of the electronic device being lower than a preset threshold, and collecting fingerprints; and customizing the lighting the screen based on user configuration or default settings of the electronic device in response to the power of the electronic device being greater than or equal to the preset threshold.

Figure 2A:
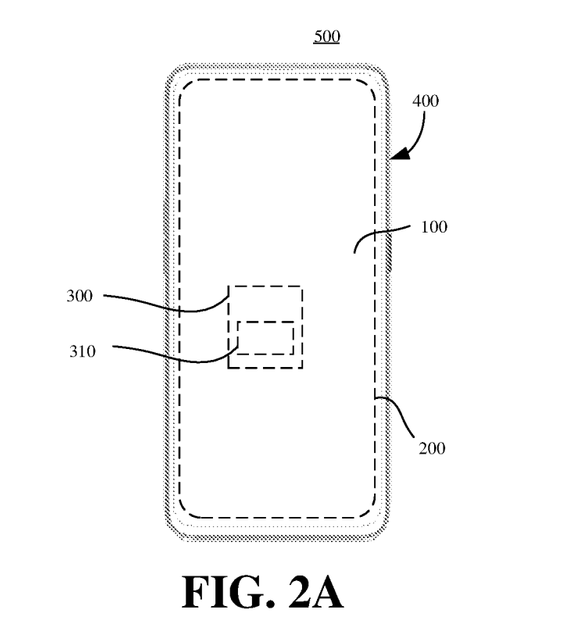
FIG. 2A is a structural schematic view of an electronic device according to an embodiment of the present disclosure.
Figure 2B:
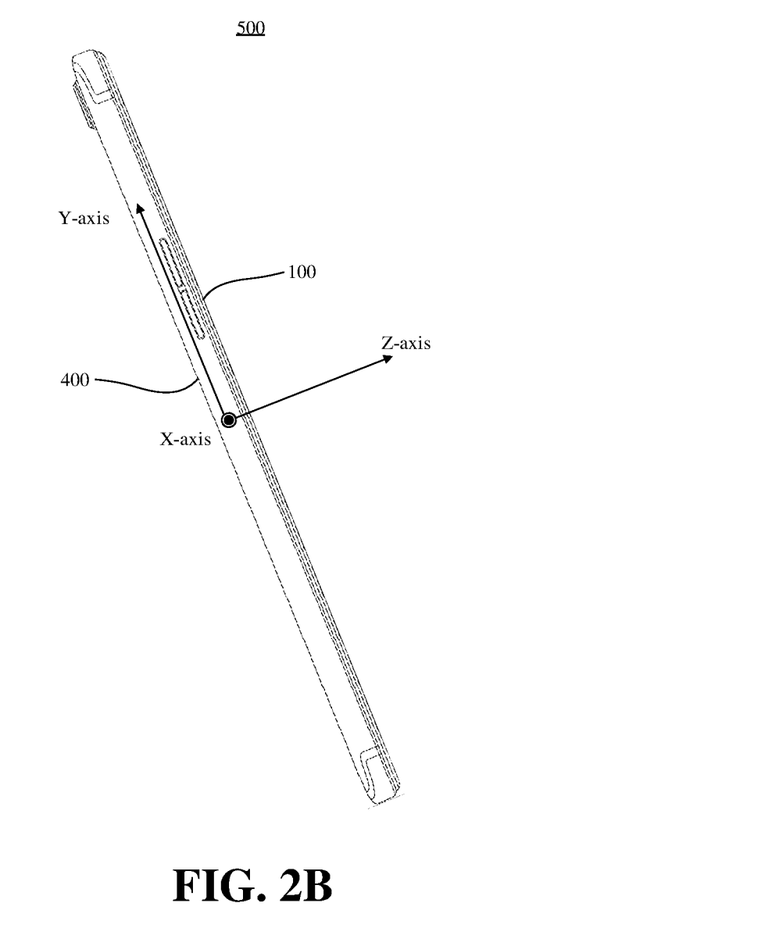
FIG. 2B is a schematic view of coordinates of a screen of an electronic device according to an embodiment of the present disclosure.

Referring to FIGS. 2A and 2B, FIG. 2A is a structural schematic view of an electronic device 500 according to an embodiment of the present disclosure. An under-screen fingerprint module 300 is applied to the electronic device 500. The electronic device 500 includes a screen 100, the under-screen fingerprint module 300 corresponding to a preset area of the screen 100, and a back cover 400 connected and opposite to the screen 100. That is, at least part of a vertical projection of the preset area on the back cover 400 and at least part of a vertical projection of the under-screen fingerprint module 300 on the back cover 400 are overlapped.

FIG. 2B is a schematic view of coordinates of a screen of an electronic device according to an embodiment of the present disclosure. As shown in FIG. 2B, the coordinate origin is at the center of the screen. With the coordinate origin as a reference, the positive direction of the Z axis of the screen is perpendicular to a screen surface and away from a back cover, and the reverse direction of the Z axis of the screen is perpendicular to the screen surface and facing the back cover, that is, a direction opposite to the positive direction of the Z axis of the screen.

The screen 100 is arranged with a first polarizer 200, and the under-screen fingerprint module 300 is arranged with a second polarizer 310. A polarization direction of the first polarizer 200 and that of the second polarizer 310 are the same. The first polarizer 200 and the second polarizer 310 are configured to filter the first optical noise 101. The first optical noise 101 is reflected light. The reflected light is light generated from first light reflected by the screen. The first light is part of emitted light of the screen and irradiated along a positive direction of a Z axis of the screen.

The second polarizer 310 is further configured to filter the second optical noise 102. The second optical noise 102 is direct light. The direct light is second light, which is part of the emitted light of the screen and irradiated along a reverse direction of the Z axis of the screen.

The under-screen fingerprint module is arranged in a space between the preset area of the screen and the back cover. Specifically, the under-screen fingerprint module may be arranged adjacently to an inner surface of the screen and along the reverse direction of the Z axis of the screen in the preset area. The preset area of the screen and the under-screen fingerprint module are correspondingly arranged.

The polarizer is an artificial diaphragm, which has the ability to selectively absorb light vibrations in different directions and control the polarization direction of a specific beam. In this way, a specific polarization direction can be determined for the film. When the natural light passes through the polarizer, light vibration component perpendicular to the polarization direction of film is completely absorbed, and only the light vibration component parallel to the polarization direction of film is passed. That is, light of which vibration direction is perpendicular to a transmission axis of the polarizer will be absorbed, and only polarized light of which vibration direction is parallel to the transmission axis of the polarizer is left to be transmitted. The specific direction of the polarizer is called the polarization vibration direction of the polarizer.

In a specific implementation, the first polarizer 200 may be arranged above a display layer in the screen, and the second polarizer 310 may be arranged in the under-screen fingerprint module 300 below the display layer. The polarization directions of the first polarizer 200 and the second polarizer 310 are the same. That is, the first polarizer 200 and the second polarizer 310 are parallel, and the light transmission is largest. When the first light irradiated from the screen and away from the under-screen fingerprint module is reflected by an outer glass of the screen through a screen medium, the polarization direction will change. For example, the angle between the polarization direction of the reflected first light and that of the polarizer increases. In this way, after passing through the second polarizer 310, the reflected first light will be attenuated.

When the second light irradiated along the reverse direction of the Z axis of the screen passes through the second polarizer 310, only the light vibration component parallel to the polarization direction of the polarizer passes, and the light vibration component perpendicular to the polarization direction of the polarizer is completely absorbed. Therefore, the direct noise light will be attenuated by half after passing through the polarizer.

It can be seen that in the embodiments of the present disclosure, the electronic device includes a screen and an under-screen fingerprint module corresponding to a preset area of the screen; the screen is arranged with a first polarizer, and the under-screen fingerprint module is arranged with a second polarizer. A polarization direction of the first polarize and that of the second polarizer are the same. The first polarizer and the second polarizer are configured to filter a first optical noise. The first optical noise is reflected light. The reflected light is light generated from first light reflected by the screen. The first light is part of emitted light of the screen and irradiated along a positive direction of a Z axis of the screen. The second polarizer is further configured to filter a second optical noise. The second optical noise is direct light. The direct light is second light, which is part of the emitted light of the screen and irradiated along a reverse direction of the Z axis of the screen. It can be seen that the first polarizer and the second polarizer can absorb the light vibration in a specific polarization direction in the first and second optical noises to attenuate the first and second optical noises. Since the polarization direction of the first polarize and that of the second polarizer are the same, the second polarizer will not attenuate the effective light reflected by the fingerprint, thereby reducing the interference of the noise light on the fingerprint collection and recognition, achieving noise reduction, and improving the accuracy and efficiency of fingerprint image collection and recognition.

In an embodiment, the screen 100 includes a liquid crystal display (LCD) screen or an organic light emitting diode (OLED) display screen.

The screen may be an LCD screen. The LCD screen is a flat ultra-thin display device, which includes a number of color pixels or black and white pixels, and is placed in front of a light source or a reflective surface. The LCD screen further includes a pixel layer, a liquid crystal layer, and a backlight layer from a top side to a bottom side. The backlight layer emits light. The liquid crystal layer controls to transmit or block light emitted from the light source. The pixel layer controls the color display. After the backlight layer of the LCD screen is lit, the liquid crystal layer controls a light emission position of the preset area, that is, a light penetration position. The screen may also be an OLED display screen. The OLED (in a self-luminous principle), also known as organic electric laser display and organic light-emitting semiconductor, directly controls a lighting position of the preset area.

In an embodiment, the first optical noise 101 and/or the second optical noise 102 are light emitted from the preset area.

Referring to FIG. 1, the first optical noise 101 is the light emitted from the preset area, reflected by the outer glass of the screen 100 and directed toward the under-screen fingerprint module. The second optical noise 102 is light emitted from the preset area and directly directed toward the under-screen fingerprint module. The first optical noise 101 and the second optical noise 102 are both perpendicular to the screen 100.

It can be seen that in this embodiment, the first optical noise and the second optical noise are both perpendicular to the screen. The polarizer absorbs light vibration in a specific polarization direction in the first and second optical noises, so that the first and second optical noises are attenuated. Since the polarization direction of the first polarize and that of the second polarizer are the same, the second polarizer will not attenuate the light reflected by the fingerprint, thereby achieving noise reduction, and improving the accuracy of fingerprint image collection.

In an embodiment, the electronic device includes the under-screen fingerprint module including a collimating lens, the second polarizer, an infrared (IR) film, and the optical fingerprint sensor. The second polarizer is arranged between the collimating lens and the IR film. The IR film is arranged on a surface of the optical fingerprint sensor.

Figure 3A:
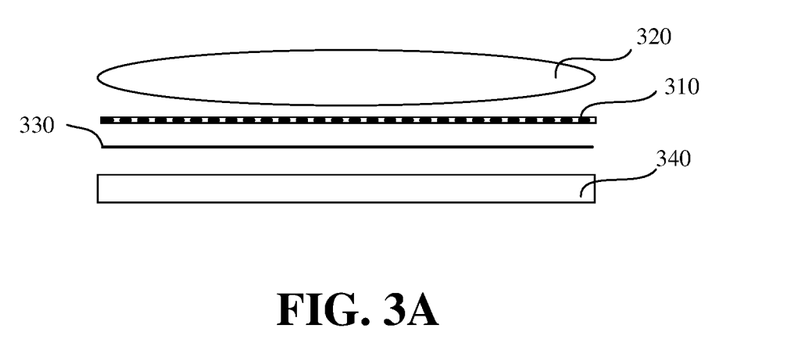
FIG. 3A is a structural schematic view of an under-screen fingerprint module according to an embodiment of the present disclosure.

In an embodiment, referring to FIG. 3A, which is a structural schematic view of a fingerprint module according to an embodiment of the present disclosure, the under-screen fingerprint module includes the collimating lens 320, the second polarizer 310, the IR film 330 and the optical fingerprint sensor 340. The second polarizer 310 is arranged between the collimating lens 320 and the IR film 330. The IR film 330 is arranged on the surface of the optical fingerprint sensor 340.

The second polarizer 310 is arranged between the collimating lens 320 and the IR film 330. The polarizer can absorb the light vibration component in a specific polarization direction of the first optical noise 101 and second optical noise 102 perpendicular to the screen 100 to attenuate the first optical noise 101 and second optical noise 102.

It can be seen that, in this embodiment, since the polarizer only passes the light vibration parallel to the polarization direction of the polarizer, the light vibration component of the specific direction in the first and second optical noises is absorbed. Since the polarization direction of the first polarize and that of the second polarizer are the same, the second polarizer will not attenuate the light reflected by the fingerprint, thereby achieving noise reduction, and improving the accuracy of fingerprint image collection.

In an embodiment, the collimating lens 320 and the second polarizer 310 are integrated or stacked.

The integrated arrangement of the collimating lens 320 and the second polarizer 310 refers to embedding the second polarizer 310 into the collimating lens 320 to form a collimating lens with a polarization function. The stacked arrangement of the collimating lens 320 and the second polarizer 310 refers to stacking the second polarizer 310 on a side of the collimating lens 320 facing the optical fingerprint sensor 340.

It can be seen that in this embodiment, the collimating lens and the second polarizer are integrated or stacked, which may realize the polarizing function, reduce optical noise, improve the accuracy of fingerprint collection, and reduce the screen thickness. Moreover, there are various methods to arrange the collimating lens and the second polarizer.

In an embodiment, the second polarizer 310 and the IR film 330 are integrated or stacked.

The integrated arrangement of the second polarizer 310 and the IR film 330 refers to embedding the second polarizer 310 and the IR film 330 to form an IR film with a polarization function or form a polarizer with an IR film function. The stacked arrangement of the second polarizer 310 and the IR film 330 refers to stacking the second polarizer 310 on a side of the IR film 330 facing the collimating lens 320.

It can be seen that in this embodiment, the second polarizer and the IR film are integrated or stacked, which may realize the polarizing function, reduce optical noise, improve the accuracy of fingerprint collection, and reduce the screen thickness. Moreover, there are various methods to arrange the second polarizer and the IR film.

Figure 3B:
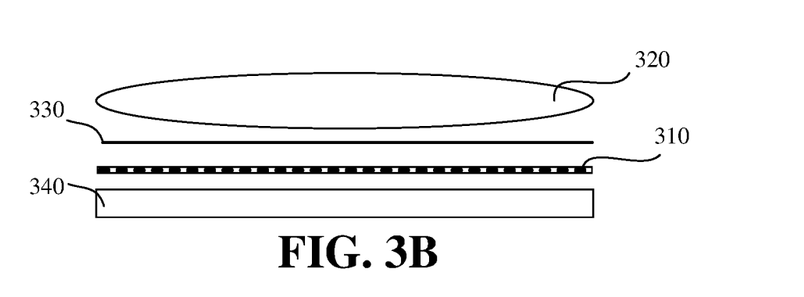
FIG. 3B is a structural schematic view of an under-screen fingerprint module according to another embodiment of the present disclosure.

In an embodiment, referring to FIG. 3B which is a structural schematic view of a under-screen fingerprint module according to another embodiment of the present disclosure, the under-screen fingerprint module includes the collimating lens 320, the second polarizer 310, the IR film 330 and the optical fingerprint sensor 340. The second polarizer 310 is arranged between the IR film 330 and the optical fingerprint sensor 340. The IR film 330 is arranged on the surface of the collimating lens 320.

The second polarizer 310 is arranged between the IR film 330 and the fingerprint sensor 340. The polarizer can absorb the light vibration component in a specific polarization direction of the first optical noise 101 and second optical noise 102 perpendicular to the screen 100 to attenuate the first optical noise 101 and second optical noise 102.

It can be seen that, in this embodiment, since the polarizer only passes the light vibration parallel to the polarization direction of the polarizer, the light vibration component of the specific polarization direction in the first and second optical noises is absorbed. Since the polarization direction of the first polarize and that of the second polarizer are the same, the second polarizer will not attenuate the light reflected by the fingerprint, thereby achieving noise reduction, and improving the accuracy of fingerprint image collection.

In an embodiment, the IR film 330 and the second polarizer 310 are integrated or stacked.

The integrated arrangement of the IR film 330 and the second polarizer 310 refers to embedding the IR film 330 and the second polarizer 310 to form an IR film with a polarization function or form a polarizer with an IR film function. The stacked arrangement of the IR film 330 and the second polarizer 310 refers to stacking the second polarizer 310 on a side of the IR film 330 facing the optical fingerprint sensor 340.

It can be seen that in this embodiment, the second polarizer and the IR film are integrated or stacked, which may realize the polarizing function, reduce optical noise, improve the accuracy of fingerprint collection, and reduce the screen thickness. Moreover, there are various methods to arrange the second polarizer and the IR film.

In an embodiment, the second polarizer 310 and the optical fingerprint sensor 340 are integrated or stacked.

The integrated arrangement of the second polarizer 310 and the optical fingerprint sensor 340 refers to embedding the second polarizer 310 into the optical fingerprint sensor 340 to form an optical fingerprint sensor with a polarizing function. The stacked arrangement of the second polarizer 310 and the optical fingerprint sensor 340 refers to stacking the second polarizer 310 on a side of the optical fingerprint sensor 340 facing the IR film 330.

It can be seen that in this embodiment, the second polarizer and the optical fingerprint sensor are integrated or stacked, which may realize the polarizing function, reduce optical noise, improve the accuracy of fingerprint collection, and reduce the screen thickness. Moreover, there are various methods to arrange the second polarizer and the optical fingerprint sensor.

Figure 4:
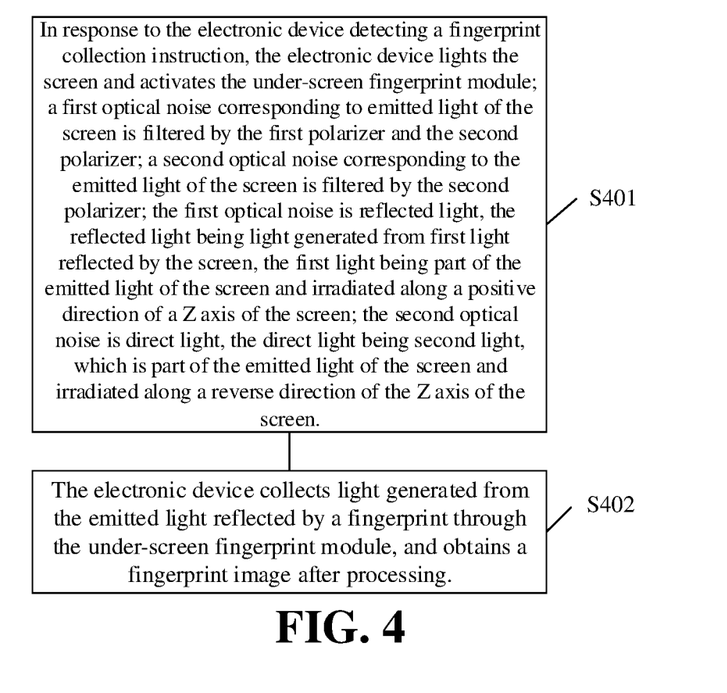
FIG. 4 is a flow chart of a fingerprint image processing method according to an embodiment of the present disclosure.

Referring to FIG. 4, which is a flow chart of a fingerprint image processing method according to an embodiment of the present disclosure, the method is applied to the electronic device as shown in FIG. 2A. The electronic device 500 includes the screen 100 and the under-screen fingerprint module 300 corresponding to the preset area of the screen 100. The screen 100 is arranged with the first polarizer 200, and the under-screen fingerprint module 300 is arranged with the second polarizer 310. The polarization direction of the first polarizer 200 and that of the second polarizer 310 are the same. The fingerprint image processing method may include operations at blocks illustrated in FIG. 4.

At block S401: In response to the electronic device detecting a fingerprint collection instruction, the electronic device lights the screen and activates the under-screen fingerprint module; a first optical noise corresponding to emitted light of the screen is filtered by the first polarizer and the second polarizer; a second optical noise corresponding to the emitted light of the screen is filtered by the second polarizer; the first optical noise is reflected light, the reflected light being light generated from first light reflected by the screen, the first light being part of the emitted light of the screen and irradiated along a positive direction of a Z axis of the screen; the second optical noise is direct light, the direct light being second light, which is part of the emitted light of the screen and irradiated along a reverse direction of the Z axis of the screen.

At block S402: The electronic device collects light generated from the emitted light and reflected by a fingerprint through the under-screen fingerprint module, and obtains a fingerprint image after processing.

It can be seen that in the embodiment of the present disclosure, the electronic device includes a screen and an under-screen fingerprint module corresponding to a preset area of the screen; the screen is arranged with a first polarizer, and the under-screen fingerprint module is arranged with a second polarizer. A polarization direction of the first polarize and that of the second polarizer are the same. The first polarizer and the second polarizer are configured to filter a first optical noise. The first optical noise is reflected light. The reflected light is light generated from first light reflected by the screen. The first light is part of emitted light of the screen and irradiated along a positive direction of a Z axis of the screen. The second polarizer is further configured to filter a second optical noise. The second optical noise is direct light. The direct light is second light, which is part of the emitted light of the screen and irradiated along a reverse direction of the Z axis of the screen. It can be seen that the first polarizer and the second polarizer can absorb the light vibration in a specific polarization direction in the first and second optical noises to attenuate the first and second optical noises. Since the polarization direction of the first polarize and that of the second polarizer are the same, the second polarizer will not attenuate the effective light reflected by the fingerprint, thereby reducing the interference of the noise light on the fingerprint collection and recognition, achieving noise reduction, and improving the accuracy and efficiency of fingerprint image collection and recognition.

In an embodiment, the lighting the screen includes: lighting the preset area of the screen.

When detecting the fingerprint collection instruction, the electronic device lights the preset area of the screen, that is, the area corresponding to which the under-screen fingerprint module is located. After the build-in light source emits light, the angle of the light refracted on the uneven lines of the fingerprint on the surface of the finger will be different. The lightness of the reflected light will be different. Finally, the fingerprint image may be formed.

It can be seen that, in this embodiment, the lighting the preset area of the screen may make the area corresponding to which the under-screen fingerprint module is located higher in brightness, and make the optical fingerprint collection more accurate and faster.

In an embodiment, the lighting the screen includes: lighting all areas of the screen.

It can be seen that in this embodiment, the all areas of the screen are lit to make the optical fingerprint collection more accurate and faster.

In an embodiment, the lighting the preset area of the screen includes: in response to the screen being in a bright state, increasing the brightness of the preset area of the screen and increasing the difference in brightness between the preset area of the screen and other areas of the screen; in response to the screen being in an off state, only lighting the preset area of the screen.

When the fingerprint collection instruction is detected, the electronic device increases the brightness of the preset area when the screen is in the bright state, such that the area corresponding to which the under-screen fingerprint module is located is higher in brightness, and the optical fingerprint collection is more accurate and faster. When the screen is in the off state, only the area corresponding to which the under-screen fingerprint module is arranged is lit.

It can be seen that in this embodiment, increasing the brightness of the preset area of the screen when the screen is in the bright state or only lighting the preset area when the screen is in the off state may reduce the influence of light outside the preset area on the optical fingerprint sensor and make the optical fingerprint collection more accurate and faster.

In an embodiment, the lighting all areas of the screen includes: increasing the brightness of the screen in response to the screen being in the bright state, and lighting the all areas of the screen in response to the screen being in the off state.

When the screen is in the bright state, the increasing the brightness of the screen refers to increasing the brightness of the screen to a highest level, such that the optical fingerprint sensor may collect fingerprint light. When the screen is in the off state, the lighting the all areas of the screen may refer to lighting up the brightness of the screen to be greater than a minimum brightness required by the optical fingerprint sensor to collect fingerprints.

It can be seen that in this embodiment, the lighting the all areas of the screen makes the optical fingerprint collection more accurate and faster.

In an embodiment, in response to the fingerprint collection instruction being detected, a system state of the electronic device is detected, the system state including at least one of: a screen state and a battery state.

When the fingerprint collection instruction is detected, the system state of the electronic device is detected, and the screen is lit based on the system state. For example, when the power is lower than a preset value, only the preset area is lit or the brightness is low, which is only greater than the minimum brightness required by the optical fingerprint sensor to collect fingerprints. When the power is sufficient, that is, when the power is greater than or equal to the preset value, the way to light the screen may be customized based on user configuration or default settings of the electronic device.

It can be seen that in this embodiment, the electronic device may light up the screen based on the system state, which may reduce the energy consumption of the electronic device and save power.

Figure 5:
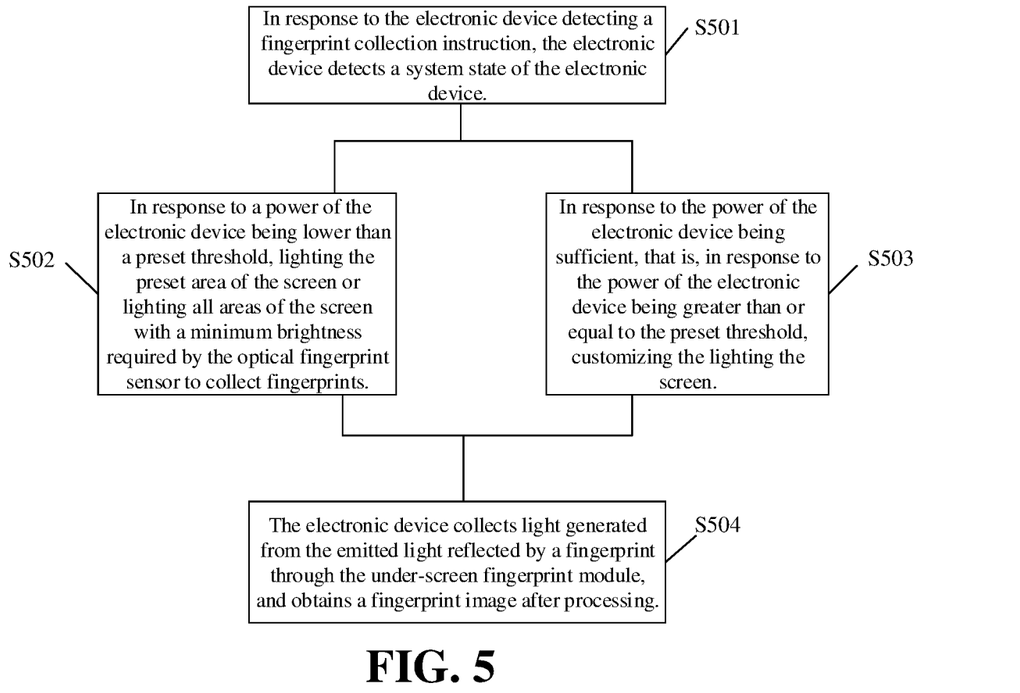
FIG. 5 is a flow chart of a fingerprint image processing method according to another embodiment of the present disclosure.

Referring to FIG. 5, which is a flow chart of a fingerprint image processing method according to another embodiment of the present disclosure, the method is applied to the electronic device as shown in FIG. 2A. The electronic device 500 includes the screen 100 and the under-screen fingerprint module 300 corresponding to the preset area of the screen 100. The screen 100 is arranged with the first polarizer 200, and the under-screen fingerprint module 300 is arranged with the second polarizer 310. The polarization direction of the first polarizer 200 and that of the second polarizer 310 are the same. The fingerprint image processing method may include operations at blocks illustrated in FIG. 5.

At block S501: In response to the electronic device detecting a fingerprint collection instruction, the electronic device detects a system state of the electronic device.

At block S502: In response to a power of the electronic device being lower than a preset threshold, lighting the preset area of the screen or lighting all areas of the screen with a minimum brightness required by the optical fingerprint sensor to collect fingerprints.

At block S503: In response to the power of the electronic device being sufficient, that is, in response to the power of the electronic device being greater than or equal to the preset threshold, customizing the lighting the screen.

At block S504: The electronic device collects light generated from the emitted light reflected by a fingerprint through the under-screen fingerprint module, and obtains a fingerprint image after processing.

It can be seen that in the embodiment of the present disclosure, the electronic device includes a screen and an under-screen fingerprint module corresponding to a preset area of the screen; the screen is arranged with a first polarizer, and the under-screen fingerprint module is arranged with a second polarizer. A polarization direction of the first polarize and that of the second polarizer are the same. The first polarizer and the second polarizer are configured to filter a first optical noise 101. The first optical noise is reflected light. The reflected light is light generated from first light reflected by the screen. The first light is part of emitted light of the screen and irradiated along a positive direction of a Z axis of the screen. The second polarizer is further configured to filter a second optical noise. The second optical noise is direct light. The direct light is second light, which is part of the emitted light of the screen and irradiated along a reverse direction of the Z axis of the screen. It can be seen that the first polarizer and the second polarizer can absorb the light vibration in a specific polarization direction in the first and second optical noises to attenuate the first and second optical noises. Since the polarization direction of the first polarize and that of the second polarizer are the same, the second polarizer will not attenuate the effective light reflected by the fingerprint, thereby reducing the interference of the noise light on the fingerprint collection and recognition, achieving noise reduction, and improving the accuracy and efficiency of fingerprint image collection and recognition.

Referring to FIGS. 2A and 2B, FIG. 2A is a structural schematic view of an electronic device 500 according to an embodiment of the present disclosure. The electronic device 500 includes a screen 100 and an under-screen fingerprint module 300 corresponding to a preset area of the screen 100. The screen 100 is arranged with a first polarizer 200, and the under-screen fingerprint module 300 is arranged with a second polarizer 310. A polarization direction of the first polarizer 200 and that of the second polarizer 310 are the same. The first polarizer 200 and the second polarizer 310 are configured to filter a first optical noise 101. The first optical noise 101 is reflected light. The reflected light is light generated from first light reflected by the screen. The first light is part of emitted light of the screen and irradiated along a positive direction of a Z axis of the screen. The second polarizer 310 is further configured to filter a second optical noise 102. The second optical noise 102 is direct light. The direct light is second light, which is part of the emitted light of the screen and irradiated along a reverse direction of the Z axis of the screen.

It can be seen that in the embodiments of the present disclosure, the electronic device includes a screen and an under-screen fingerprint module corresponding to a preset area of the screen; the screen is arranged with a first polarizer, and the under-screen fingerprint module is arranged with a second polarizer. A polarization direction of the first polarize and that of the second polarizer are the same. The first polarizer and the second polarizer are configured to filter a first optical noise. The first optical noise is reflected light. The reflected light is light generated from first light reflected by the screen. The first light is part of emitted light of the screen and irradiated along a positive direction of a Z axis of the screen. The second polarizer is further configured to filter a second optical noise. The second optical noise is direct light. The direct light is second light, which is part of the emitted light of the screen and irradiated along a reverse direction of the Z axis of the screen. It can be seen that the first polarizer and the second polarizer can absorb the light vibration in a specific polarization direction in the first and second optical noises to attenuate the first and second optical noises. Since the polarization direction of the first polarize and that of the second polarizer are the same, the second polarizer will not attenuate the effective light reflected by the fingerprint, thereby reducing the interference of the noise light on the fingerprint collection and recognition, achieving noise reduction, and improving the accuracy and efficiency of fingerprint image collection and recognition.

In an embodiment, the screen 100 includes a liquid crystal display (LCD) screen or an organic light emitting diode (OLED) display screen.

The screen may be an LCD screen. The LCD screen is a flat ultra-thin display device, which includes a number of color pixels or black and white pixels, and is placed in front of a light source or a reflective surface. The LCD screen further includes a pixel layer, a liquid crystal layer, and a backlight layer from a top side to a bottom side. The backlight layer emits light. The liquid crystal layer controls to transmit or block light emitted from the light source. The pixel layer controls the color display. After the LCD screen is backlight-lit, the liquid crystal layer controls a light emission position of the preset area, that is, a light penetration position. The screen may also be an OLED display screen. The OLED (in a self-luminous principle), also known as organic electric laser display and organic light-emitting semiconductor, directly controls a lighting position of the preset area.

In an embodiment, the first optical noise 101 and/or the second optical noise 102 are light emitted from the preset area.

Referring to FIG. 1, the first optical noise 101 is the light emitted from the preset area, reflected by the outer glass of the screen 100 and directed toward the under-screen fingerprint module. The second optical noise 102 is light emitted from the preset area and directly directed toward the under-screen fingerprint module. The first optical noise 101 and the second optical noise 102 are both perpendicular to the screen 100.

It can be seen that in this embodiment, the first optical noise and the second optical noise are both perpendicular to the screen. The polarizer absorbs light vibration in a specific polarization direction in the first and second optical noises, so that the first and second optical noises are attenuated. Since the polarization direction of the first polarize and that of the second polarizer are the same, the second polarizer will not attenuate the light reflected by the fingerprint, thereby achieving noise reduction, and improving the accuracy of fingerprint image collection.

In an embodiment, the electronic device includes the under-screen fingerprint module including a collimating lens, the second polarizer, an infrared (IR) film, and the optical fingerprint sensor. The second polarizer is arranged between the collimating lens and the IR film. The IR film is arranged on a surface of the optical fingerprint sensor.

The above mainly introduces the solutions of the embodiments of the present disclosure from the perspective of the execution process on the structure and method side. It can be understood that, in order to realize the above-mentioned functions, the electronic device includes a hardware structure and/or a software module corresponding to each function. Those skilled in the art should easily realize that, in combination with the units and algorithm steps of the examples described in the embodiments provided herein, the present disclosure can be implemented in the form of hardware or a combination of hardware and computer software. Whether a function is executed by hardware or computer software driven hardware depends on the specific application and design constraints of the technical solution. Those skilled in the art can use different methods for each specific application to implement the described functions, but such implementation should not be considered beyond the scope of the present disclosure.

In the embodiments of the present disclosure, the functional unit of the electronic device may be divided according to the above method embodiments. For example, each functional unit may be divided corresponding to each function, or two or more functions may be integrated into one processing unit. The above integrated unit may be implemented in the form of hardware or software functional unit. It should be noted that the division of the units in the embodiments of the present disclosure is schematic, and is only a division of logical functions. In actual implementation, there may be another division manner.

Figure 6:
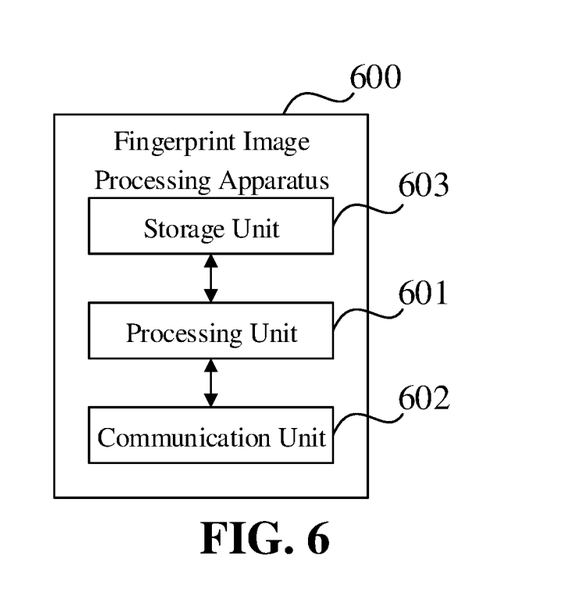
FIG. 6 is a block view of functional units of a fingerprint image processing apparatus according to an embodiment of the present disclosure.

FIG. 6 is a block view of functional units of a fingerprint image processing apparatus according to an embodiment of the present disclosure. The fingerprint image processing apparatus 600 is applied to an electronic device, the electronic device including a screen and an under-screen fingerprint module corresponding to a preset area of the screen. The fingerprint image processing apparatus 600 includes a processing unit 601 and a communication unit 602.

The processing unit 601 is configured to, in response to a fingerprint collection instruction being detected, light the screen and activate the under-screen fingerprint module via the communication unit 602; a first optical noise 101 corresponding to emitted light of the screen is filtered by the first polarizer and the second polarizer; a second optical noise 102 corresponding to the emitted light of the screen is filtered by the second polarizer; the first optical noise 101 is reflected light, the reflected light being light generated from first light reflected by the screen, the first light being part of the emitted light of the screen and irradiated along a positive direction of a Z axis of the screen; the second optical noise 102 is direct light, the direct light being second light, which is part of the emitted light of the screen and irradiated along a reverse direction of the Z axis of the screen.

The fingerprint image processing apparatus 600 further includes a storage unit 603, which is configured to store data of the electronic device.

It can be seen that in the embodiment of the present disclosure, the electronic device includes a screen and an under-screen fingerprint module corresponding to a preset area of the screen; the screen is arranged with a first polarizer, and the under-screen fingerprint module is arranged with a second polarizer. A polarization direction of the first polarize and that of the second polarizer are the same. The first polarizer and the second polarizer are configured to filter a first optical noise. The first optical noise is reflected light. The reflected light is light generated from first light reflected by the screen. The first light is part of emitted light of the screen and irradiated along a positive direction of a Z axis of the screen. The second polarizer is further configured to filter a second optical noise. The second optical noise is direct light. The direct light is second light, which is part of the emitted light of the screen and irradiated along a reverse direction of the Z axis of the screen. It can be seen that the first polarizer and the second polarizer can absorb the light vibration in a specific polarization direction in the first and second optical noises to attenuate the first and second optical noises. Since the polarization direction of the first polarize and that of the second polarizer are the same, the second polarizer will not attenuate the effective light reflected by the fingerprint, thereby reducing the interference of the noise light on the fingerprint collection and recognition, achieving noise reduction, and improving the accuracy and efficiency of fingerprint image collection and recognition.

In an embodiment, in terms of the lighting the screen, the processing unit 601 is specifically configured to light the preset area of the screen.

In an embodiment, in terms of the lighting the screen, the processing unit 601 is specifically configured to light all areas of the screen.

In an embodiment, in terms of the lighting the preset area of the screen, the processing unit 601 is specifically configured to: in response to the screen being in a bright state, increase the brightness of the preset area of the screen and increase the difference in brightness between the preset area of the screen and other areas of the screen; in response to the screen being in an off state, only light the preset area of the screen.

In an embodiment, in terms of the lighting all areas of the screen, the processing unit 601 is specifically configured to: increase the brightness of the screen in response to the screen being in the bright state, and light the all areas of the screen in response to the screen being in the off state.

In an embodiment, in response to the fingerprint collection instruction being detected, the processing unit 601 is specifically configured to detect a system state of the electronic device, the system state including at least one of: a screen state and a battery state.

The processing unit 601 may be a processor, the communication unit 602 may be an internal communication bus, etc., and the storage unit 603 may be a memory.

An embodiment of the present disclosure further provides a computer storage medium. The computer storage medium stores a computer program for electronic data exchange, and the computer program causes the computer to perform part or all of the operations of any method described in the foregoing method embodiments. The aforementioned computer includes the electronic device.

An embodiment of the present disclosure also provides a computer program product. The computer program product includes a non-transitory computer-readable storage medium that stores the computer program. The computer program is operable to cause the computer to perform part or all of the operations of any method described in the foregoing method embodiments. The computer program product may be a software installation package. The aforementioned computer includes the electronic device.

It should be noted that, for the sake of simple description, the foregoing method embodiments are all expressed as a series of action combinations, but those skilled in the art should know that the present disclosure is not limited by the described action sequence. According to the present disclosure, certain operations can be performed in other orders or simultaneously. Moreover, those skilled in the art should also know that the embodiments described in the specification are all preferred embodiments, and the involved actions and modules are not necessarily required by the present disclosure.

In the above embodiments, the description of each embodiment has its own emphasis. For a part that is not detailed in an embodiment, reference can be made to related descriptions in other embodiments.

In the several embodiments provided in the present disclosure, it should be understood that the disclosed device may be implemented in other ways. For example, the device embodiments described above are only schematic. For example, the division of the above-mentioned units is only a division of logical functions. In actual implementation, there may be other division methods, for example, multiple units or components may be combined or integrated to another system, or some features can be ignored, or not implemented. In addition, the displayed or discussed mutual couplings or direct couplings or communication connections may be indirect couplings or communication connections through some interfaces, devices or units, and may be in electrical or other forms.

The units described as separate components may or may not be physically separated, and the components displayed as units may or may not be physical units, that is, they may be located in one place or may be distributed on multiple network units. Some or all of the units may be selected according to actual needs to achieve the purpose of the solution of the embodiments.

In addition, each functional unit in each embodiment of the present disclosure may be integrated into one processing unit, or each unit may exist alone physically, or two or more units are integrated into one unit. The above integrated unit may be implemented in the form of hardware or software functional unit.

If the above integrated unit is implemented in the form of a software functional unit and sold or used as an independent product, it may be stored in a computer readable memory. Based on this understanding, the technical solution of the present disclosure essentially or part with contribution to the existing technology or all or part of the technical solution can be embodied in the form of a software product. The computer software product is stored in a memory, including several instructions to enable a computer device (which may be a personal computer, a server, or a network device, etc.) to perform all or part of the operations of the above methods in various embodiments of the present disclosure. The aforementioned memory includes: U disk, read-only memory (ROM), random access memory (RAM), mobile hard disk, magnetic disk or optical disk and other media that can store program codes.

Those skilled in the art may understand that all or part of the operations in the various methods of the above embodiments may be completed by a program instructing relevant hardware. The program may be stored in a computer-readable memory, and the memory may include: flash disk, read-only memory (ROM), random access memory (RAM), mobile hard disk, magnetic disk or optical disk, etc.

The embodiments of the present disclosure are described in detail above, and specific examples are used to explain the principle and implementation of the present disclosure. The descriptions of the above embodiments are only to help understand the method and core idea of the present disclosure. Those skilled in the art, according to the ideas of the present disclosure, may have changes in specific implementations and application scopes. In summary, the content of this specification should not be construed as limiting the present disclosure.

What is claimed is:

1. An under-screen fingerprint module for an electronic device, the electronic device comprising a screen and a back cover connected and opposite to the screen; the screen defining a preset area and being arranged with a first polarizer configured to filter a first optical noise;

wherein the under-screen fingerprint module is configured to be arranged between the back cover and the screen, at least part of a vertical projection of the preset area on the back cover and at least part of a vertical projection of the under-screen fingerprint module on the back cover are overlapped; and the under-screen fingerprint module comprises a body and a second polarizer arranged in the body; a polarization direction of the second polarizer is configured to be the same as that of the first polarizer;

wherein the second polarizer is configured to filter the first optical noise; the first optical noise is reflected light, the reflected light generated from first light reflected by the screen, the first light being part of emitted light of the screen and irradiated along a direction perpendicular to a surface of the screen and away from the back cover of the electronic device;

wherein the second polarizer is further configured to filter a second optical noise; the second optical noise is direct light, the direct light being second light, the second light being part of the emitted light of the screen and irradiated along a direction perpendicular to the surface of the screen and towards the back cover of the electronic device; and wherein the under-screen fingerprint module is configured to collect light generated from the emitted light reflected by a fingerprint and to obtain a fingerprint image after processing.

2. The under-screen fingerprint module according to claim 1, wherein the body comprises a collimating lens, an infrared film, and an optical fingerprint sensor; the second polarizer is arranged between the collimating lens and the infrared film; and the infrared film is arranged on a surface of the optical fingerprint sensor.

3. The under-screen fingerprint module according to claim 2, wherein the collimating lens and the second polarizer are integrated or stacked.

4. The under-screen fingerprint module according to claim 3, wherein the integrated arrangement of the collimating lens and the second polarizer comprises the second polarizer being embedded into the collimating lens; and the stacked arrangement of the collimating lens and the second polarizer comprises the second polarizer being stacked on a side of the collimating lens facing the optical fingerprint sensor.

5. The under-screen fingerprint module according to claim 2, wherein the second polarizer and the infrared film are integrated or stacked.

6. The under-screen fingerprint module according to claim 5, wherein the integrated arrangement of the second polarizer and the infrared film comprises the second polarizer and the infrared film being embedded;

the stacked arrangement of the second polarizer and the infrared film comprises the second polarizer being stacked on a side of the infrared film facing the collimating lens.

7. The under-screen fingerprint module according to claim 1, wherein the body comprises a collimating lens, an infrared film, and an optical fingerprint sensor; the second polarizer is arranged between the infrared film and the optical fingerprint sensor; the infrared film is arranged on a surface of the collimating lens.

8. The under-screen fingerprint module according to claim 6, wherein the infrared film and the second polarizer are integrated or stacked.

9. The under-screen fingerprint module according to claim 6, wherein the second polarizer and the optical fingerprint sensor are integrated or stacked.

10. An electronic device, comprising:
a back cover;
a screen, connected and opposite to the back cover, defining a preset area, and arranged with a first polarizer configured to filter a first optical noise; and
an under-screen fingerprint module, arranged between the back cover and the screen, and comprising a body and a second polarizer arranged in the body;
wherein a polarization direction of the second polarizer is configured to be the same as that of the first polarizer;
wherein the second polarizer is configured to filter the first optical noise; the first optical noise is reflected light, the reflected light generated from first light reflected by the screen, the first light being part of emitted light of the screen and irradiated along a direction perpendicular to a surface of the screen and away from the back cover of the electronic device;
wherein the second polarizer is further configured to filter a second optical noise; the second optical noise is direct light, the direct light being second light, the second light being part of the emitted light of the screen and irradiated along a direction perpendicular to the surface of the screen and towards the back cover of the electronic device; and
wherein the under-screen fingerprint module is configured to collect light generated from the emitted light reflected by a fingerprint and to obtain a fingerprint image after processing.

11. The electronic device according to claim 10, wherein the under-screen fingerprint module is arranged in a space between the preset area of the screen and the back cover, and arranged adjacently to an inner surface of the screen; and
at least part of a vertical projection of the preset area on the back cover and at least part of a vertical projection of the under-screen fingerprint module on the back cover are overlapped.

12. The electronic device according to claim 11, wherein at least one of the first optical noise and the second optical noise are light emitted from the preset area.

13. The electronic device according to of claim 12, wherein the first optical noise and the second optical noise are perpendicular to the screen.

14. A fingerprint image processing method, for an electronic device; the electronic device comprising a screen defining a preset area and being arranged with a first polarizer; a back cover connected and opposite to the screen; and an under-screen fingerprint module configured to be arranged between the back cover and the screen;
wherein at least part of a vertical projection of the preset area on the back cover and at least part of a vertical projection of the under-screen fingerprint module on the back cover are overlapped; the under-screen fingerprint module comprises a body and a second polarizer arranged in the body; a polarization direction of the second polarizer is configured to be the same as that of the first polarizer; the method comprises:
in response to detecting a fingerprint collection instruction, lighting the screen and activating the under-screen fingerprint module; wherein a first optical noise corresponding to emitted light of the screen is filtered by the first polarizer and the second polarizer; a second optical noise corresponding to the emitted light of the screen is filtered by the second polarizer; the first optical noise is reflected light, the reflected light generated from first light reflected by the screen, the first light being part of the emitted light of the screen and irradiated along a direction perpendicular to a surface of the screen and away from the back cover of the electronic device; the second optical noise is direct light, the direct light being second light, the second light being part of the emitted light of the screen and irradiated along a direction perpendicular to the surface of the screen and towards the back cover of the electronic device; and
collecting light generated from the emitted light reflected by a fingerprint by the under-screen fingerprint module, and obtaining a fingerprint image after processing.

15. The method according to claim 14, wherein the lighting the screen comprises: lighting the preset area of the screen.

16. The method according to claim 15, wherein the lighting the preset area of the screen comprises:
increasing a difference in the brightness between the preset area of the screen and other areas of the screen by increasing a brightness of the preset area of the screen in the condition of the screen being in a bright state; and
lighting the preset area of the screen in the condition of the screen being in an off state.

17. The method according to claim 16, wherein the lighting the screen comprises: lighting the whole screen.

18. The method according to claim 17, wherein the lighting the all areas of the screen comprises:
increasing a brightness of the whole screen in the condition of the screen being in the bright state; and
lighting the whole screen in the condition of the screen being in the off state.

19. The method according to claim 14, wherein the lighting the screen comprises:
detecting a system state of the electronic device, and lighting the screen based on the system state;
wherein the system state comprises at least one of: a screen state and a battery state.

20. The method according to claim 19, wherein in a case of the system state comprising the battery state, the lighting the screen based on the system state comprises:

lighting the preset area of the screen or lighting all areas of the screen with a minimum brightness required by an optical fingerprint sensor in response to a power of the electronic device being lower than a preset threshold, and collecting fingerprints; and customizing the lighting the screen based on user configuration or default settings of the electronic device in response to the power of the electronic device being greater than or equal to the preset threshold.

\* \* \* \* \*